United States Patent
Nagasaka et al.

(10) Patent No.: US 8,402,389 B2
(45) Date of Patent: Mar. 19, 2013

(54) METHODS AND APPARATUS FOR DISPLAYING CONTENTS USING ICON IMAGES

(75) Inventors: Hideo Nagasaka, Kanagawa (JP);
Mamoru Tokashiki, Tokyo (JP);
Toshimasa Miyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 12/154,001

(22) Filed: May 19, 2008

(65) Prior Publication Data

US 2008/0295028 A1 Nov. 27, 2008

(30) Foreign Application Priority Data

May 21, 2007 (JP) .................................. 2007-133664

(51) Int. Cl.
*G06F 3/048* (2006.01)
*G06F 3/00* (2006.01)
(52) U.S. Cl. .................... 715/810; 715/747; 709/223
(58) Field of Classification Search .......... 715/810–845, 715/863; 709/223
See application file for complete search history.

(56) References Cited

U.S. PATENT DOCUMENTS

| | | | | |
|---|---|---|---|---|
| 6,317,784 B1 * | 11/2001 | Mackintosh et al. | ......... | 709/219 |
| 6,501,490 B1 * | 12/2002 | Bell | .............. | 715/837 |
| 6,570,597 B1 * | 5/2003 | Seki et al. | ..................... | 715/835 |
| 2003/0020762 A1 * | 1/2003 | Budrys et al. | ................ | 345/835 |
| 2004/0119756 A1 * | 6/2004 | Kumhyr et al. | ............... | 345/837 |
| 2004/0158555 A1 * | 8/2004 | Seedman et al. | .................. | 707/3 |
| 2005/0216864 A1 * | 9/2005 | Dart et al. | ...................... | 715/839 |
| 2005/0234983 A1 * | 10/2005 | Plastina et al. | ............. | 707/104.1 |
| 2006/0170945 A1 * | 8/2006 | Bill | .............................. | 358/1.13 |
| 2006/0230331 A1 * | 10/2006 | Abanami et al. | .............. | 715/500 |
| 2007/0061309 A1 * | 3/2007 | Klein, Jr. | ......................... | 707/3 |
| 2008/0182628 A1 * | 7/2008 | Lee et al. | ...................... | 455/566 |

FOREIGN PATENT DOCUMENTS

| | | |
|---|---|---|
| JP | 5-028719 A | 2/1993 |
| JP | 7-193878 A | 7/1995 |
| JP | 11-232840 A | 8/1999 |
| JP | 2000-200475 A | 7/2000 |
| JP | 2000-207417 A | 7/2000 |
| JP | 2000207417 A * | 7/2000 |
| JP | 2003-157088 A | 5/2003 |
| JP | 2003-242164 A | 8/2003 |
| JP | 2003-256104 A | 9/2003 |
| JP | 2003-256867 A | 9/2003 |
| JP | 2004-229297 A | 8/2004 |
| JP | 2004-242288 A | 8/2004 |
| JP | 2005-274993 A | 10/2005 |
| JP | 2006-040134 A | 2/2006 |
| JP | 2006-053664 A | 2/2006 |
| JP | 2006-081175 A | 3/2006 |
| JP | 2006-099091 A | 4/2006 |
| JP | 2006-195562 A | 7/2006 |
| JP | 2006-202302 A | 8/2006 |

(Continued)

*Primary Examiner* — Kieu Vu
*Assistant Examiner* — James T Durkin
(74) *Attorney, Agent, or Firm* — Wolf, Greenfield & Sacks, P.C.

(57) ABSTRACT

A content display method includes the steps of acquiring an icon image corresponding to a data content set composed of a plurality of data contents, generating a plurality of specific icons which are different from each other and correspond to the data contents, on the basis of the icon image and a predetermined generation rule, and displaying the specific icons on a display.

9 Claims, 7 Drawing Sheets

FOREIGN PATENT DOCUMENTS

| | | |
|---|---|---|
| JP | 2004-004271 A | 1/2007 |
| JP | 2007-073139 A | 3/2007 |
| JP | 2007-115180 A | 5/2007 |
| WO | WO 02/065339 A1 | 8/2002 |
| WO | WO 02-065339 A1 | 8/2002 |
| WO | WO 2005/031700 A1 | 4/2005 |
| WO | WO 2006/106631 A1 | 10/2006 |

* cited by examiner

FIG. 2

| DTBL | | | | |
|---|---|---|---|---|
| ALBUM | ALBUM JACKET PICTURE | ALBUM ICON | MUSIC PIECE | MUSIC PIECE ICON |
| A | PJ | P0 | 1<br>2<br>3<br>•<br>•<br>•<br>N | P1<br>P2<br>P3<br>•<br>•<br>•<br>PN |

METHODS AND APPARATUS FOR DISPLAYING CONTENTS USING ICON IMAGES

CROSS REFERENCES TO RELATED APPLICATIONS

The present invention contains subject matter related to Japanese Patent Application JP 2007-133664 filed in the Japanese Patent Office on May 21, 2007, the entire contents of which are incorporated herein by reference.

BACKGROUND OF THE INVENTION

1. Field of the Invention

The present invention relates to methods for displaying data contents such as data of music pieces, display apparatuses, display programs, and server apparatuses.

2. Description of the Related Art

Playback apparatuses having large-capacity storages (storage media or storage devices) such as hard disk devices and non-volatile memories are becoming increasingly widespread as music playback apparatuses. Such playback apparatuses permit saving or storage of thousands or tens of thousands of music pieces. Thus, users can always prepare data of music pieces and carry the music data with them to listen to a desired music piece.

In addition, systems in which music data is distributed to playback apparatuses via the Internet or the like have been in public use.

Techniques related to the above apparatuses and systems are disclosed, for example, in Japanese Unexamined Patent Application Publication No. 2000-207417 and Japanese Unexamined Patent Application Publication No. 2006-202302.

SUMMARY OF THE INVENTION

Data of music pieces (hereinafter also simply referred to as music pieces) to be commercially distributed through a network or the like may be attached with images, icons, or thumbnail images suitable for the music pieces (hereinafter simply referred to as icons). In this case, if such icons are displayed, a user can identify each of the music pieces simply by "viewing" displayed icons when selecting a desired music piece to be purchased and selecting one of purchased music pieces in a storage unit to be played back. The user can also register the purchased music pieces in a playlist.

However, in many cases, music albums such as CD (compact disc) music albums and network-distributed music albums are attached with only single image data of corresponding album jacket pictures. In such a case, when music pieces contained in a music album are stored in a storage unit, the user has to "read" the names of the music pieces and artists displayed in the form of character strings for identifying the individual music pieces to select one of the stored music pieces for playback and record the music piece in the playlist. This reduces visibility and operability as compared with the case of icons described above.

In setting of icons for music pieces, if the jacket picture of an album is used as the icons representing the music pieces, identical icons are displayed as representing the individual music pieces, which makes it impossible for the user to distinguish the music pieces from each other.

The present invention has been made in view of the above circumstances.

Accordingly, there is a need for a method for displaying a data content which includes the steps of acquiring an icon image corresponding to a data content set composed of a plurality of data contents, generating a plurality of specific icons which are different from each other and correspond to the data contents, on the basis of the icon image and a predetermined generation rule, and displaying the specific icons on a display.

According to the present invention, a user can identify a desired music piece and recognize what music pieces are recorded in what album merely by viewing icons. In addition, the user can distinguish the music pieces from each other even if the music pieces are from the same album.

DESCRIPTION OF THE PREFERRED EMBODIMENTS

The following embodiments of the present invention can be applied to individual data contents or a group of access paths to the data contents, and such data contents will be described using examples of a plurality of music data contents provided as an album. In the following description, music data content and music piece data are also simply referred to as a music content and a music piece, respectively.

[1] Outline

In the present embodiment, when a plurality of music pieces are recorded in an album, the following processes are performed.

(1) Icons (reduced images) are prepared for each of the music pieces.

(2) These icons are images indicating the relationship of the music pieces to the album. That is, icons of music pieces recorded in the same album have a common image.

(3) The icons of the music pieces are each provided with identification image information for identify the corresponding music pieces. For example, frames of different colors are added to the icons of the music pieces.

The above arrangement allows a user to select a music piece and recognize the album in which the music piece is recorded by viewing the icons. In addition, the user can distinguish the music pieces from each other which are from the same album merely by viewing the icons.

[2] Examples of Icons

Figure 1A:
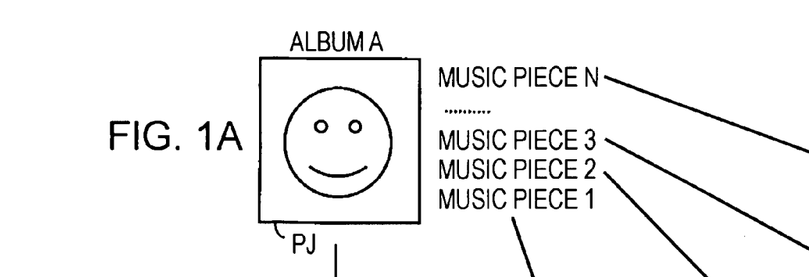
FIGS. 1A to 1C illustrate examples of icons according to an embodiment of the present invention.

In the following, examples of icons will be described with an example of a case where a plurality of music pieces 1 to N are recorded in an album A and are copied from a CD to a storage unit of a playback apparatus. It is assumed that an image (image data) PJ illustrated in FIG. 1A has been prepared for the album A. This image PJ may be generated by, for example, scanning a picture of the jacket of the album A using a scanner and downloading the picture from a label company. It is also possible that the user generates the image PJ using graphics software.

[2-1] Example 1

Figure 1B:
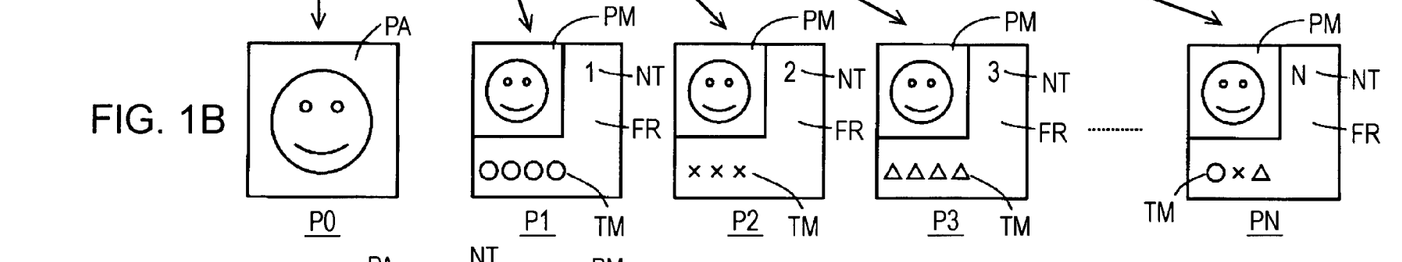

FIG. 1B illustrates examples of icons corresponding to the album A and the music pieces recorded in the album A. Specifically, an icon P0 shown in FIG. 1B represents the album A and is composed of a reduced image of the image PJ (reduced image PA). This icon P0 is mainly used as a representative image of the album A.

In FIG. 1B, icons P1 to PN represent the music pieces 1 to N, respectively. Each of the icons P1 to PN includes a reduced image of the image PJ or the image PA (reduced image PM) and a frame FR having a reversed L-shape arranged adjacent to the right and bottom sides of the image PM.

Figure 2:
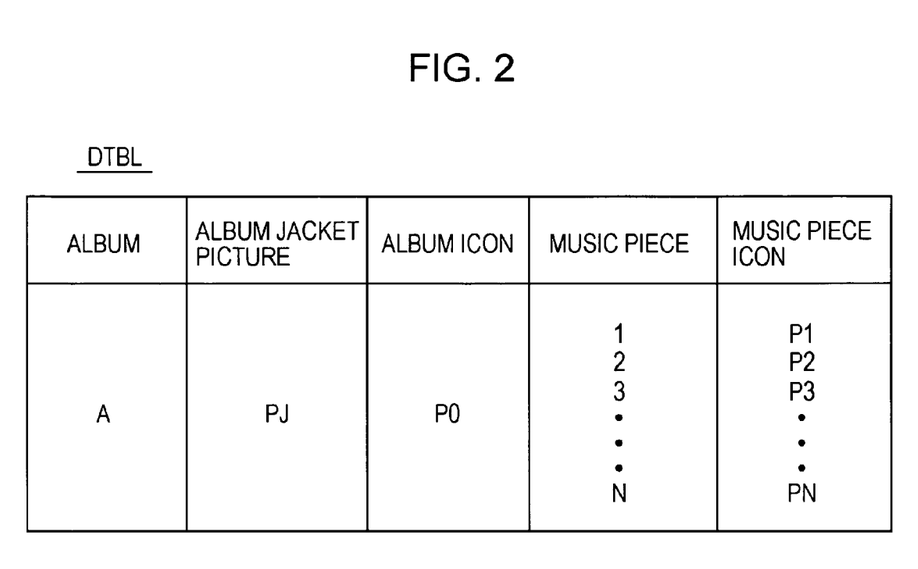
FIG. 2 illustrates a data table according to an embodiment of the present invention.

In this case, the icons P1 to PN correspond to the music pieces 1 to N, respectively. Thus, as illustrated in FIG. 2, a correspondence table DTBL is provided which indicates the correspondence relationship between the album A, the image data PJ of the jacket picture of the album A, the album icon P0, recorded music pieces 1 to N and the corresponding icons P1 to PN. Specifically, the corresponding table DTBL indicates that the album A represented by the icon P0 includes the music pieces 1 to N represented by the icon P1 to PN and that the album A and its contents (recorded music pieces 1 to N) correspond to the icon P0 and the icons P1 to PN, respectively.

Further, the individual frames FR of the icons P1 to PN have different color tones (hue, saturation, and brightness) in accordance with the contents of the corresponding music pieces 1 to N, including, for example, tempo, melody, impression, release date, play length, title, and lyric. For example, a music piece with a cheerful melody may be associated with a warm color and a music piece with a calm melody may be associated with a cold color. It is also possible to simply allocate hues to the music piece numbers 1 to N so as to be associated with each other.

In this example, it is also possible that the frames FR of the icons P1 to PN include numbers corresponding to the music pieces 1 to N. Specifically, in the case of a CD, each of the frames RF has a number NT indicating a track number and characters TM indicating the title of the corresponding music piece. It is also possible to use a letter of the alphabet instead of the number NT.

When the music pieces 1 to N of the album A are stored in the storage unit, the icon P0, the icons P1 to PN, and the correspondence table DTBL are also stored in the storage unit. Music pieces of other albums are similarly stored in the storage unit. Needless to say, when the icon P0 and the icons P1 to PN are to be generated from the image data PJ so as to be displayed, it is not necessary to store these icons in the storage unit.

Thus, if a plurality of albums are stored in the storage unit, display of the icons P0 corresponding to the albums enables the user to identify each of the albums and select a desired album only by viewing the icons P0. Similarly, by viewing the icons P1 to PN, the user can identify the individual music piece P1 to PN to select a desired music piece.

[2-2] Example 2

Figure 1C:
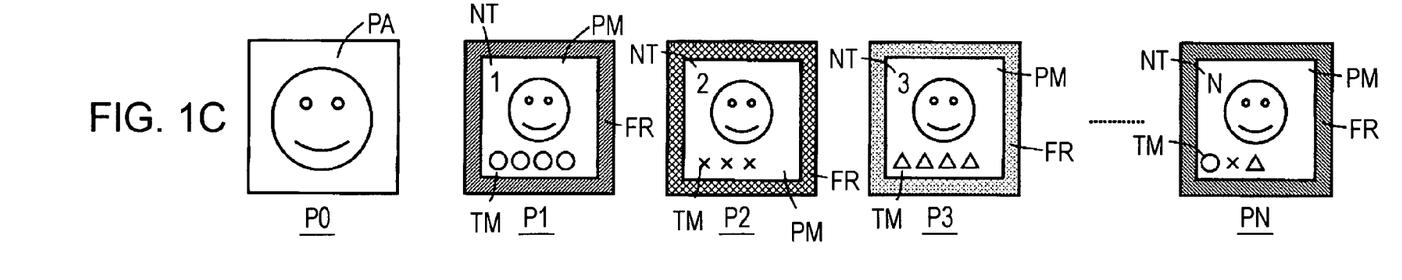

FIG. 1C illustrates another example of an icon representing the album A and icons representing its contents (music pieces 1 to N). Specifically, in this example, an icon P0 of the album A is generated similarly to the Example 1 described above. However, icons P1 to PN are generated so that each of them includes a reduced image of the image PJ of the jacket picture (reduced image PM) and a frame FR enclosing the image PM.

The individual frames FR corresponding to the icons P1 to PN have different color tones according to the contents of the music pieces 1 to N. In addition, each of the frames FR has a number NT (e.g., track number) of a corresponding music piece and characters TM indicating the title of a corresponding music piece.

[2-3] Other Examples

An icon P0 of the album A may be generated similarly to the case of [2-1] described above, and icons P1 to PN are generated so that each includes a reduced image of the image PJ of the jacket picture (reduced image PM). However, in this example, the color tones of the individual N reduced images PM of the icons P1 to PN are different from each other. For example, a sepia tone (monotone) is applied to the image PM corresponding to a music piece of the earliest release date and more colors are applied to the images PM of the newer music pieces.

Each of the icons P1 to PN also represents the album A containing the corresponding music pieces 1 to N and a respective one of the music pieces 1 to N, as described above. Thus, it is also possible to add arbitrary identification images are added to the reduced images PM. With this arrangement, the user can recognize that the music pieces belong to the same album A from a common part of the reduced images PM and distinguish the individual music pieces from each other by viewing the identification images added to the reduced images PM.

It is also possible that the individual icons P1 to PN have different shapes according to the music pieces 1 to N, and this arrangement can also be incorporated into the above arrangements. Also in these cases, numbers NT and titles TM may be displayed on or adjacent to the icons P1 to PN.

Note that in this embodiment, a criterion used in generating specific icons to be allocated to individual music pieces, such as the track number, tempo, and melody, as described in [2], is referred to as a generation rule.

[3] Operations

In the following, operations to be performed when a music piece is played back or recorded in a playlist will be described.

[3-1] Playback of Music Piece

Figure 3A:
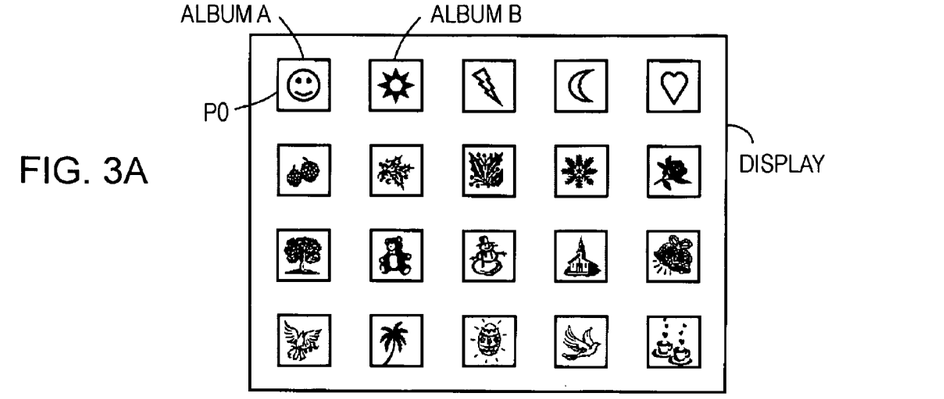
FIGS. 3A and 3B illustrate examples of display of icons.

In playback of music pieces recorded in an album, a specific music piece among music pieces stored in a storage unit may be played back. Specifically, when a playback apparatus is instructed to start playback, a list of icons representing albums stored in the storage unit is displayed on a display, as illustrated in FIG. 3A, for example. Thus, the user can identify the album containing the desired music piece.

Figure 3B:
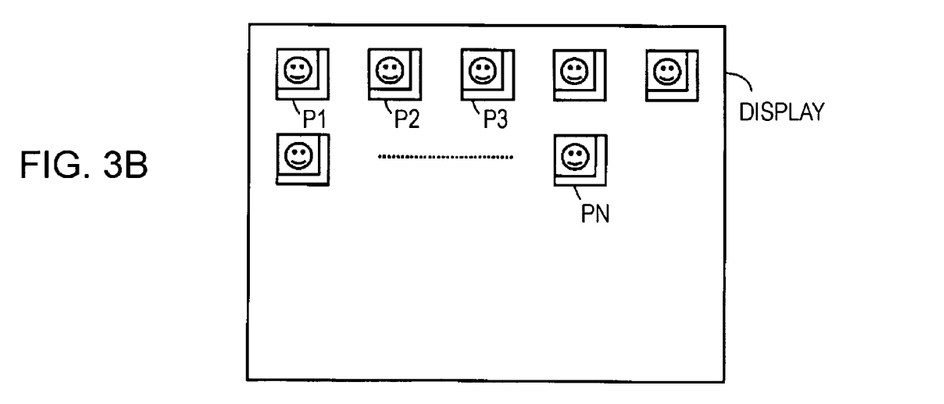

When the user designates and selects the icon of the album (for example, the icon P0 of the album A) using a pointing device, a list of the icons P1 to PN of the music pieces 1 to N recorded in the album A is displayed, as illustrated in FIG. 3B. This allows the user to identify the desired music piece only by viewing the displayed icons P1 to PN.

Then, when the user designates and selects the icon i of the desired album i (i is an integer from 1 to N) using the pointing device, the playback apparatus determines that the music piece i corresponding to the icon Pi has been selected by referring to the correspondence table DTBL. As a result, the music piece i (a data file of the music piece i) is read out from the storage unit and played back. This arrangement allows the user to identify a desired music piece merely by viewing the icons P1 to PN and facilitates playback of the desired music piece.

When the playback apparatus is in a playback mode, music pieces can be played back on an album-by-album basis, or in the order of the titles, in the order of track numbers, or at random regardless of the relationship of the music pieces to albums.

[3-2] Registration of the Playlist

Music pieces stored in a storage unit may be registered in a playlist. Storing a music piece in the playlist does not mean storing music data contents itself as a list but means storing the access paths to the music data contents, i.e., storage locations (addresses) of the music data contents.

Figure 4A:
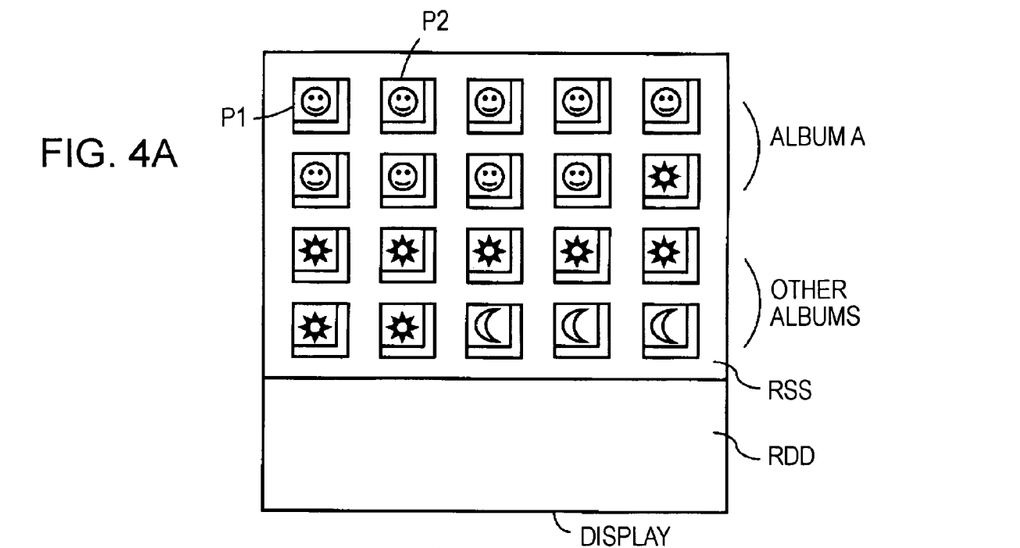
FIGS. 4A and 4B illustrate examples of display of icons.

When a music piece is to be newly registered in a new playlist, a screen of the display is divided into an upper area RSS and a lower area RDD as illustrated in FIG. 4A. The upper area RSS corresponds to the music pieces to be registered in the playlist and displays a list of the icons of the music pieces stored in the storage unit. The lower area RDD corresponds to the playlist in which the music piece is to be newly registered.

At this time, in the area RSS, the icons of the music pieces recorded in the same album (for example, the icons P1 to PN of the music pieces 1 to N recorded in the album A) are displayed consecutively. The user can recognize from the reduced images PM of the icons P1 to PN that music pieces 1 to N are recorded in the album A. In the example of FIG. 4A, no icons are displayed in the area RDD since no music piece has yet been registered in the playlist.

Figure 4B:
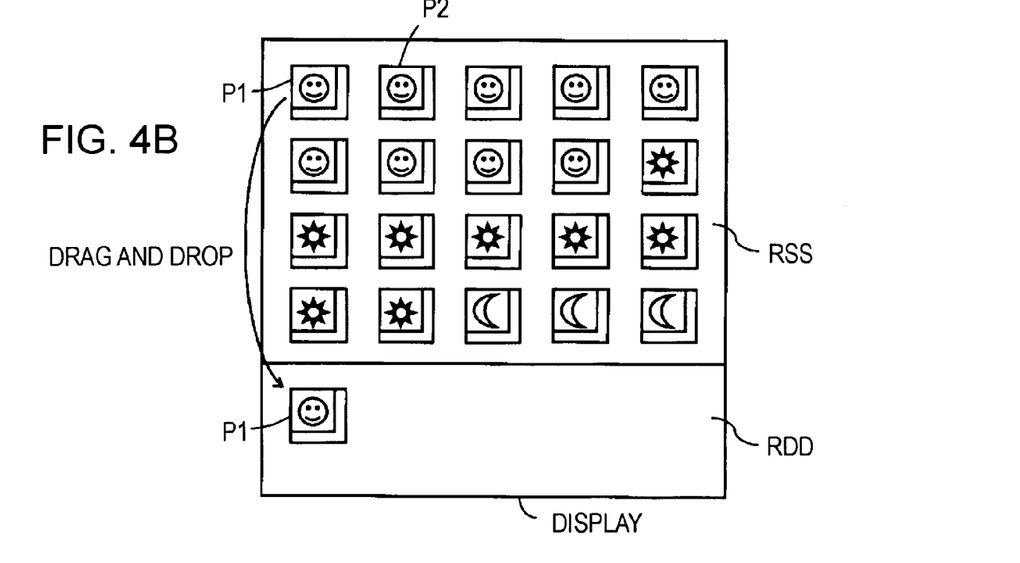

Then, as illustrated in FIG. 4B for example, the user drags and drops the icon of a desired music piece among the icons displayed in the upper area RSS to the lower area RDD using the pointing device. As a result, the music piece corresponding to the icons is registered in the playlist. This playlist can be stored in a format similar to the correspondence table DTBL illustrated in FIG. 2, for example.

Likewise, by dragging and dropping the icons of desired music pieces from the area RSS to the area RDD, the user can register the music pieces in the playlist. These icon operations facilitate registration of music pieces in the playlist.

Note that a plurality of playlists may be prepared. In such a case, the individual playlists can be represented by different icons, similarly to the case of albums.

[3-3] Playback of Music Pieces in Playlist

In the following, operations to be performed when a music piece registered in a playlist is played back will be described. In this case, similarly to the case described in [3-1] and FIG. 3A, a list of icons representing playlists is displayed on a display.

When the user designates and selects an icon of an intended playlist using a pointing device, music pieces registered in the playlist are sequentially played back. Also in this case, the music pieces may be played back according to the order in which the music pieces were registered in the playlist, in the order of the titles, or at random, for example.

In addition, a list of icons representing the music pieces registered in the playlist can be displayed. This allows the user to know if music pieces appropriate for the playlist are registered merely by viewing the icons. Specifically, among the frames FR of the displayed icons of music pieces registered in the playlist, if one frame FR has a color tone largely different from the other frames FR, the corresponding music piece can be determined to be unique from the other music pieces in the playlist.

Moreover, the icons may be arranged on the display in the order in which the corresponding music pieces in the playlist are to be played back. In this case, the icons may be arranged so that the hues of the frames FR of the displayed icons are gradually changed (for example, from a cold color to a warmer color). In this case, it may be indicated that the playlist is created with a view to gradually making the user's mood cheerful by arranging suitable music pieces in an appropriate order.

[3-4] Editing of Playlist

When a music piece registered in a playlist is also registered in another playlist or moved to another playlist, the icons of music piece can be copied or moved, similarly to the case described in [3-2]. In addition, operations on the icons in the playlist allow the order of music pieces registered in a playlist to be changed or allow the music pieces to be deleted.

[3-5] Modifications

In the above example ([3-2]), when music pieces are registered in a new playlist, icons generated from the image PJ of the jacket picture of an album are used so that the user can recognize the album from which the music pieces are. However, if an icon for identifying the play list is set in the playlist (playlist icon), icons of the music pieces may be generated at that time of drag-and-drop of the icon of a music piece to be registered on the basis of the playlist icon.

In this case, the icon displayed on the upper area RSS remains unchanged in the area RSS so that the user can identify the album.

Also in a case where the user deletes a music piece in the playlist displayed in the lower area RDD illustrated in FIG. 4B, the corresponding icon displayed in the upper area RSS remains in the lower area RSS.

Moreover, when the user sets an icon image for a playlist after music piece are registered in the playlist and displayed as illustrated in FIG. 4B as in the case of [3-2], icons corresponding to the registered music pieces are generated on the basis of the set playlist icon and displayed again. In this case, icons for the individual music pieces may be generated by, for example, combining reduced images of the playlist icon and numbers indicating the order in which the music pieces were registered in the playlist (playback order) or identification image generated according to a generation rule described in [2].

[4] Icon Generation Process

In the following, examples of processes for generating the icons described in [2] will be described.

[4-1] Icon Generation Process 1

Figure 5:
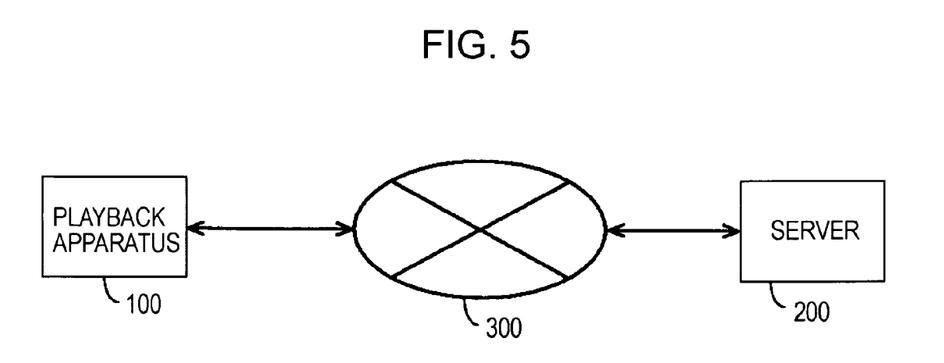
FIG. 5 illustrates a system applied to an embodiment of the present invention.

FIG. 5 illustrates an example of a system employed for generating an icon. Specifically, the system includes a playback apparatus and a server 200 connected via a network 300 such as the Internet when an icon is generated. The playback apparatus 100 is cable of controlling playback of music pieces using icons. The server 200 may be a computer which provides an icon of an album and icons of music pieces recorded in the album.

When music pieces 1 to N are stored (copied) from a CD of an album (e.g., album A) to a storage unit (not shown) of the playback apparatus 100, identification data for identifying the CD is read from the CD and transmitted from the playback apparatus 100 to the server 200 via the network 300.

Then, the server 200 identifies the CD on the basis of the identification data transmitted from the playback apparatus 100 and selects the album in the CD and music pieces recorded in the album. Specifically, in this example, image data of the icon OP of the album A and image data of the icons P1 to PN of the music pieces 1 to N are selected. The icon P0 and the icons P1 to PN have been generated on the basis of the image PJ of the jacket picture of the album A and of the icon P0, respectively.

Then, the server 200 transmits the image data of the icon P0 and the icons P1 to PN and a corresponding correspondence table DTBL to the playback apparatus 100 via the network 300. As a result, the icons P0, the icons P1 to PN and the correspondence table DTBL are stored in the storage unit of the playback apparatus 100.

Upon the storage of the icon, the playback apparatus 100 can perform the various operations described in [3] using the icons.

[4-2] Icon Generation Process 2

In the example described in [4-1], image data of icons is generated in the server 200. This increases the load on the server 200. In addition, it is necessary to prepare icons beforehand in the server 200.

However, in this example, the server 200 sends the playback apparatus 100 information for generating the icon P0 and icons P1 to PN, i.e., a generation rule for generating the image PJ of the jacket picture of the album A, the icon P0 and the icons P1 to PN, on the basis of the identification data of the CD of the album A received from the playback apparatus 100.

At this time, if the album jacket picture image PJ has already been stored in the playback apparatus 100, the playback apparatus 100 sends the server 200 a code indicating that the transmission of the image PJ is not necessary, together with the identification data of the CD of the album A. In this case, the playback apparatus 100 is to receive only the generation rule.

In addition, if the playback apparatus 100 already has an icon generation rule for the icon P0 and the icons P1 to PN, the playback apparatus 100 sends the server 200 a code indicating that the transmission of the generation rule is not necessary, together the identification data of the CD of the album A. In this case, the playback apparatus 100 is to receive only the jacket picture image PJ from the server 200.

Then, the playback apparatus 100 generates image data for the icon P0 and the icons P1 to PN on the basis of the received image PJ and/or the generation rule and a corresponding correspondence table DTBL, and stores the image data and the correspondence table in the storage unit.

Upon the storage of the image data and the correspondence table DTBL and thereafter, the playback apparatus 100 can perform the various operations described in [3] using icons. In this case, the icon P0 and icons P1 to PN are generated on the basis of the image PJ and/or the generation rule in the playback apparatus 100. Thus, the generation rule may contain items selected by the user, so that user's preference can be reflected on the design of the icons P0 and P1 to PN. That is, different icon designs based on the preference of individual users may be created for the same album and music piece.

[4-3] Icon Generation Processing 3

Figure 6:
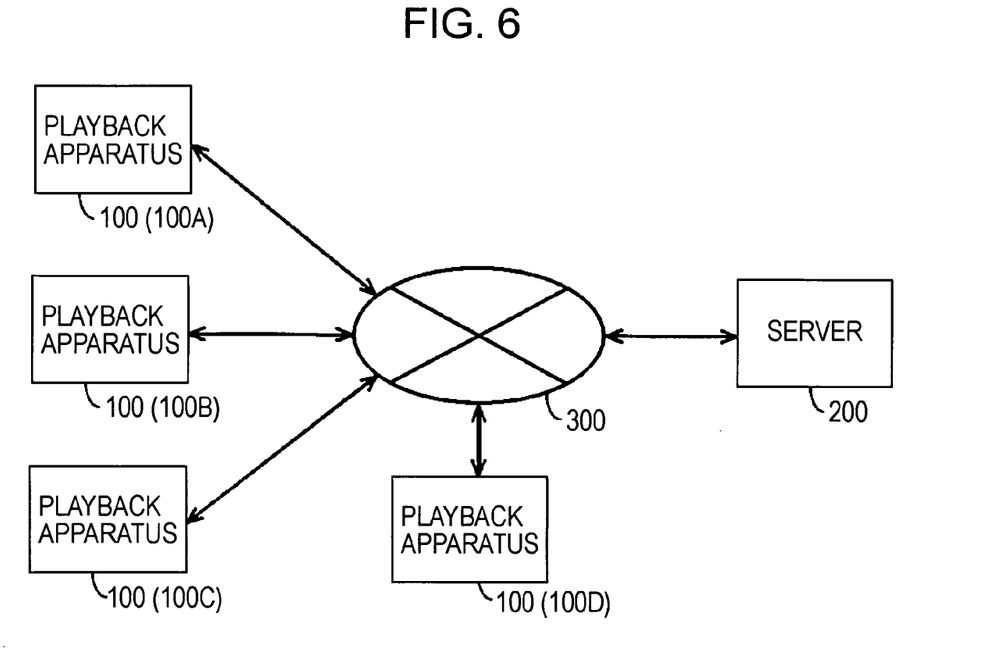
FIG. 6 illustrates another system applied to an embodiment of the present invention.

FIG. 6 illustrates another example of a system for generating an icon. In this system, icons of an album and music pieces can be shared by a plurality of users. Specifically, a plurality of playback apparatuses 100 (for example, playback apparatuses 100A to 100D) are connected to a server 200 via a network 300. For example, when image data of icons of an album and music pieces recorded in the album are generated by a user of the playback apparatus 100A, identification data of a CD containing the album and the generated image data are transmitted to the server 200 and stored in the server 200.

On the other hand, when the playback apparatus 100B transmits identification data of a CD containing an album to the server 200, for example, image data of icons of the album and music pieces corresponding to the identification data is transmitted to the playback apparatus 100B and the icon images are displayed on the display.

When the displayed icons are not preferred and not selected by the user of the playback apparatus 100B, the playback apparatus 100B notifies the server 200 of the result. Upon reception of the notifications, the server 200 transmits another icon image data to the playback apparatus 100B, and the corresponding icons are displayed on the display. The above processing is repeated until icons are selected by the user.

With this arrangement, icons of an album and music pieces can be exchanged among a plurality of users so that icons suitable for the album and music pieces can be displayed.

[5] Example of Playback Apparatus

Figure 7:
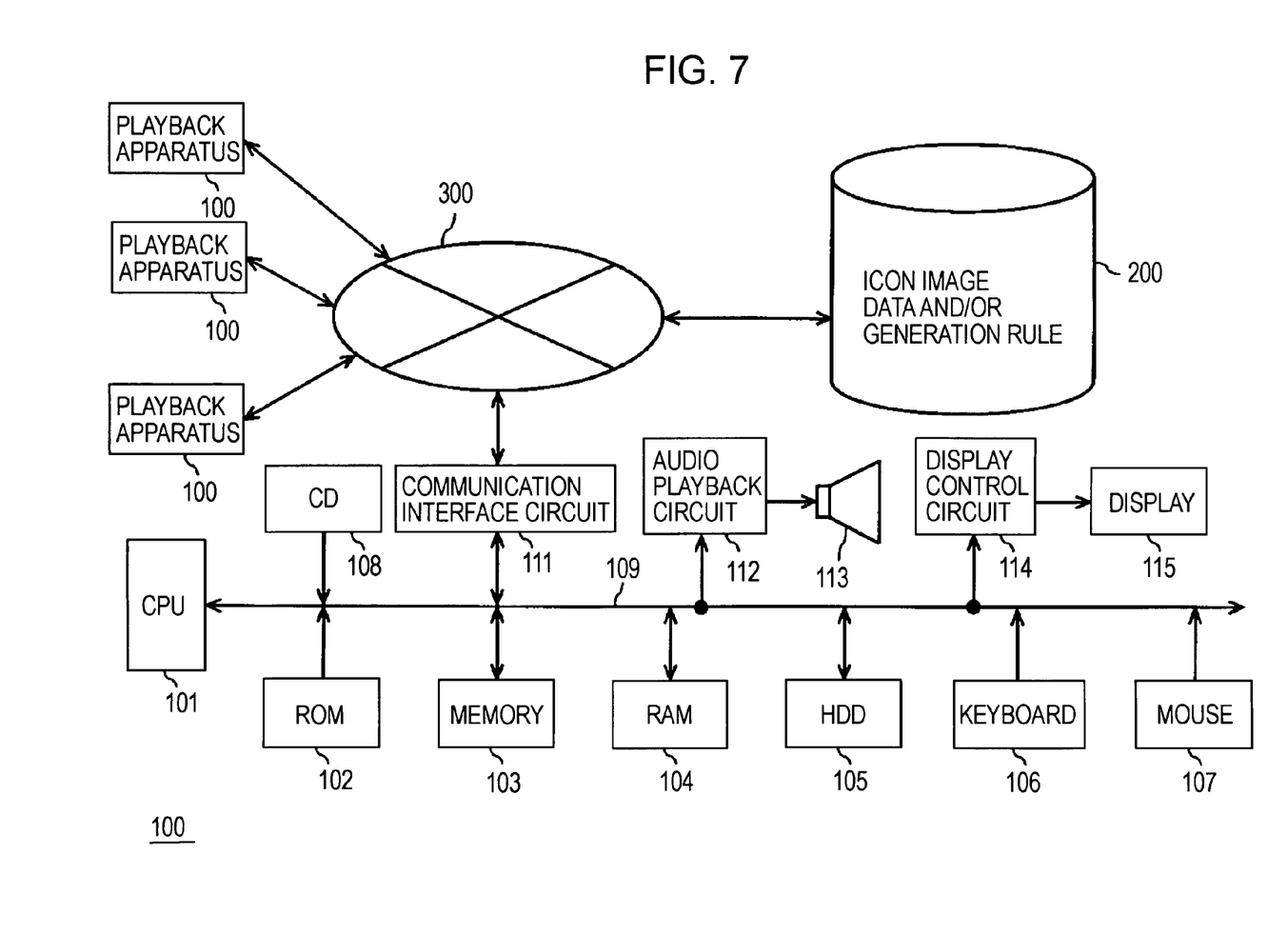
FIG. 7 illustrates a playback apparatus according to an embodiment of the present invention.

FIG. 7 illustrates an example of the playback apparatus 100 described above. This playback apparatus 100 is implemented as a personal computer which is configured similarly to general personal computers. The playback apparatus 100 includes a CPU (central processing unit) 101, a ROM (read-only memory 102), a non-volatile memory 103, and a RAM (random access memory) 104.

The CPU 101 executes various programs. The ROM 102 and the memory 103 store a BIOS (basic input/output system) executed by the CPU 101 and basic data. The RAM 104 serves as a work area used when the CPU 101 executes a program. These memories 102 to 104 are connected to the CPU 101 through a system bus 109.

In addition, a hard disk device 105 is connected to the system bus 109. The hard disk device 105 serves as a large capacity storage unit and stores data such as digital audio data of a music piece, image data of an icon, a correspondence table DTBL, and playlist data.

The hard disk device 105 includes an OS (operating system) for operating the playback apparatus 100 and software for managing stored data and reading the digital audio data of a music piece corresponding to an icon selected by a user.

The playback apparatus 100 also includes a keyboard 106 and a mouse 107 as user interfaces which are connected to the system bus 109. The mouse 107 serves as a pointing device allowing a user to designate and select an icon. In addition, a CD drive device 108 serving as an external input unit for digital audio data is connected to the system bus 109.

Further, the playback apparatus 100 includes a communication interface circuit 111 connected to the system bus 109 for connecting the playback apparatus 100 to an external network 300 and to a server 200.

The playback apparatus 100 is also provided with an audio playback circuit 112 and a display control circuit 114 which are also connected to the system bus 109. When receiving digital audio data, the audio playback circuit 112 performs decoding such as MP3 as necessary and D/A (digital to analog) conversion on the received digital audio data and supplies the resultant analog audio signals to a speaker 113.

The display control circuit 114 has a video RAM (not shown). Display data supplied to the video RAM is read at predetermined intervals and converted into video signals. The video signals are supplied to a display 115, and images illustrated in FIGS. 1A to 1C, FIGS. 3A and 3B, and FIGS. 4A and 4B, for example, are displayed on the display 115.

Thus, the display of the images allows the user to select a music piece and register the music piece in a playlist.

[6] Overview

According to the systems described above, a user can identify a desired music piece and recognize what music pieces are recorded in what album merely by viewing icons. In addition, user can distinguish the music pieces recorded from each other even if the music pieces are from the same album.

In addition, music pieces can be readily registered in a playlist by dragging and dropping corresponding icons from an upper area RSS of to a lower area RDD of a display.

Further, music pieces registered in a playlist can be indicated in the form of icons, enabling the user to determine, for example, whether music pieces suitable for the playlist are registered. For example, the color tone set in the icon frame FR of a music piece in a playlist may be largely different from those set in the icon frames RF of the other music pieces in the same playlist. This indicates that the music piece is unique from the other music pieces in the playlist.

In addition, the icons may be arranged so that the hues of the frames FR of the displayed icons are gradually changed (for example, from a cold color to a warmer color). In this case, it may be indicated that the playlist is created with a view to gradually making the user's mood cheerful by arranging suitable music pieces in an appropriate order.

Moreover, since a reduced image in an icon indicating the relationship of the icon to an album (e.g., the reduced image PM) and an icon frame FR can arbitrarily be selected and set by the user, user's preference can be reflected on the design of the icon. In addition, icons of an album and music pieces can be exchanged among a plurality of users through a network, allowing display of icons which are more desirable for the individual users.

[7] Other Modifications

When music pieces are obtained from broadcast, for example, the corresponding album may be unknown or may not exist. In such a case, a virtual album is created similarly to a playlist, and an icon P0 of the virtual album is set. Then, the music pieces are included in the virtual album so that specific icons for the individual music pieces can be generated similarly to the case described in [2].

In addition, when a playlist is created, it is also possible to display icons of music pieces in the upper area RSS of the display for each album.

In the above embodiments, a specific icon is generated for each of music pieces contained in an album or a playlist. However, the present invention is not limited to this case and can be applied to other types of data content.

For example, when picture data pieces are categorized according to the date, month, theme, or the like, a data set containing picture data pieces may be regarded as an album or a playlist. Then, an arbitrary icon is set for the data set so that the individual picture data pieces contained in the data set can be provided with specific icons. Also in this case, the user can recognize what picture data piece belongs to what data set and distinguish the picture data pieces in the same data set from each other.

Further, in the case of electronic novels and electronic comics, an icon is set for electronic data corresponding to one book and specific icons can be generated for individual electronic data pieces corresponding to chapters or sections contained in the book.

Also in the case of a music piece, an icon is set for the entire music piece and icons specific to individual parts of the music piece, such as intro, A melody, B melody, highlight, interlude, and ending, can be generated. It is also possible to generate icons specific to individual bars in the music piece. This arrangement may be applied to a music piece composed or edited by mash-up, in which parts of different music pieces are superposed or connected to make a new music piece. In this case, a user can conveniently recognize what part of an edited (mashed-up) music piece is made from what part of an original music piece merely by viewing the icons.

Needless to say, for a mashed-up music piece, it is also possible that one icon is generated for each of original music pieces as in the case of the above embodiments and icons of the original music pieces used for creating the mashed-up music piece are arranged and displayed.

Furthermore, the present invention can be applied to units of storage such as folders and directories in which data processed by a computer, such as document data, spreadsheet data, and image data, is contained. By setting an icon for a folder, specific icons corresponding to various data pieces contained in the folder can be generated. Needless to say, this can be applied not only to the case where various data pieces are directly stored in the folder but also to the case where access paths to data pieces are stored in the folder.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus comprising:
receiving means configured to receive identification information for identifying a data content set comprising a plurality of data contents from a display apparatus connected via a network;
acquiring means configured to acquire an icon image corresponding to the identification information;
generating means configured to generate first specific icons, the first specific icons being different from each other, on the basis of the acquired icon image and a predetermined generation rule, wherein, for each data content, the generating means is configured to generate a corresponding first specific icon comprising at least one color tone selected based at least in part on a mood of the data content, and wherein the predetermined generation rule comprises at least one first attribute selected by a first user to reflect a design preference of the first user; and
transmitting means configured to transmit at least the first specific icons to the display apparatus, the transmitting means being further configured to transmit at least one second specific icon to the display apparatus, the at least one second specific icon representing at least one data content in the data content set identified by the identification information received from the display apparatus, the at least one second specific icon being generated by a second user different from the first user, wherein the second user is a user of the at least one data content represented by the at least one second specific icon, and wherein the at least one second specific icon comprises at least one second attribute selected by the second user to reflect a design preference of the second user.

2. The server apparatus of claim 1, wherein the display apparatus is a first display apparatus, and wherein the receiving means is further configured to receive, from a second display apparatus different from the first display apparatus, the at least one second specific icon in association with the identification information for identifying the data content set.

3. A server apparatus comprising:
receiving means configured to receive identification information for identifying a data content set comprising a plurality of data contents from a display apparatus connected via a network;
identifying means configured to identify an icon image corresponding to the identification information; and
transmitting means configured to transmit to the display apparatus a predetermined generation rule for generating a plurality of first specific icons on the basis of the icon image, the plurality of first specific icons being different from each other and corresponding to the data contents, wherein the predetermined generation rule comprises a rule for selecting, for each data content and based at least in part on a mood of the data content, at least one color tone to be used in a first specific icon corresponding to the data content, and wherein the predetermined generation rule comprises at least one first attribute selected by a first user to reflect a design preference of the first user, the transmitting means being further configured to transmit at least one second specific icon to the display apparatus, the at least one second specific icon representing at least one data content in the data content set identified by the identification information received from the display apparatus, the at least one second specific icon being generated by a second user different from the first user, wherein the second user is a user of the at least one data content represented by the at least one second specific icon, and wherein the at least one second specific icon comprises at least one second attribute selected by the second user to reflect a design preference of the second user.

4. The server apparatus of claim 3, wherein the display apparatus is a first display apparatus, and wherein the receiving means is further configured to receive, from a second display apparatus different from the first display apparatus, the at least one second specific icon in association with the identification information for identifying the data content set.

5. A server apparatus comprising:
a receiving unit configured to receive identification information for identifying a data content set comprising a plurality of data contents from a display apparatus connected via a network;
an acquiring unit configured to acquire an icon image corresponding to the identification information;
a generating unit configured to generate first specific icons, the first specific icons being different from each other, on the basis of the acquired icon image and a predetermined generation rule, wherein, for each data content, the generating unit is configured to generate a corresponding first specific icon comprising at least one color tone selected based at least in part on a mood of the data content, and wherein the predetermined generation rule comprises at least one first attribute selected by a first user to reflect a design preference of the first user; and
a transmitting unit configured to transmit at least the first specific icons to the display apparatus, the transmitting unit being further configured to transmit at least one second specific icon to the display apparatus, the at least one second specific icon representing at least one data content in the data content set identified by the identification information received from the display apparatus, the at least one second specific icon being generated by a second user different from the first user, wherein the second user is a user of the at least one data content represented by the at least one second specific icon, and wherein the at least one second specific icon comprises at least one second attribute selected by the second user to reflect a design preference of the second user.

6. The server apparatus of claim 5, wherein:
the receiving unit is further configured to receive from the display apparatus an indication that the first user did not select a third specific icon generated by the generating unit;
the generating unit is further configured to, in response to the received indication, generate a fourth specific icon corresponding to a same data content as the third specific icon; and
the transmitting unit is further configured to transmit the fourth specific icon to the display apparatus.

7. The server apparatus of claim 5, wherein the display apparatus is a first display apparatus, and wherein the receiving unit is further configured to receive, from a second display apparatus different from the first display apparatus, the at least one second specific icon in association with the identification information for identifying the data content set.

8. A server apparatus comprising:
a receiving unit configured to receive identification information for identifying a data content set comprising a plurality of data contents from a display apparatus connected via a network;
an identifying unit configured to identify an icon image corresponding to the identification information; and
a transmitting unit configured to transmit to the display apparatus a predetermined generation rule for generating a plurality of first specific icons on the basis of the icon image, the plurality of first specific icons being different from each other and corresponding to the data contents, wherein the predetermined generation rule comprises a rule for selecting, for each data content and based at least in part on a mood of the data content, at least one color tone to be used in a first specific icon corresponding to the data content, and wherein the predetermined generation rule comprises at least one first attribute selected by a first user to reflect a design preference of the first user, the transmitting unit being further configured to transmit at least one second specific icon to the display apparatus, the at least one second specific icon representing at least one data content in the data content set identified by the identification information received from the display apparatus, the at least one second specific icon being generated by a second user different from the first user, wherein the second user is a user of the at least one data content represented by the at least one second specific icon, and wherein the at least one second specific icon comprises at least one second attribute selected by the second user to reflect a design preference of the second user.

9. The server apparatus of claim 8, wherein the display apparatus is a first display apparatus, and wherein the receiving unit is further configured to receive, from a second display apparatus different from the first display apparatus, the at least one second specific icon in association with the identification information for identifying the data content set.

* * * * *